3,340,100
CELLULAR-RIBBED BATTERY PLATE SEPARATOR
Nathan J. Silvestri, Marblehead, Mass., assignor to W. R. Grace & Co., Cambridge, Mass., a corporation of Connecticut
Filed Apr. 10, 1964, Ser. No. 358,713
5 Claims. (Cl. 136—145)

This invention relates to battery separators of the class employed between the plates of liquid-containing storage batteries for preventing short-circuiting of the battery and dislodging of the chemical materials of which the plates are comprised, and more particularly to battery separators provided with a plurality of spaced parallel ribs which are composed of a low density, highly compressible, resilient cellular material.

The copending application of Geroge E Hall et al., Ser. No. 204,890, filed June 25, 1962, now patent No. 3,205,098, discloses and claims a plate separator composed of a panel having a plurality of resilient cellular ribs affixed to at least one side of said panel which thereby minimizes plate movement during extreme vibration by exerting constant pressure on the plates. The circular ribs of the above-mentioned copending application are formed of a plasticized acid-resistant thermoplastic resin composition containing a finely divided blowing agent.

It has now been found that a superior resilient cellular rib for separators having high heat distortion temperature (high heat resistance) can be formed utilizing a predominant amount of a first thermoplastic resin and a minor amount of a second thermoplastic resin having a high plasticizer tolerance.

In making the improved separators of the present invention, a panel member is first provided. Any dimensionally-stable material which will not conduct electricity but will permit passage of electrolyte and is inert in the environment of a lead-acid cell is suitable for use as a panel. A particularly effective panel is one comprised of a cellulosic material impregnated with a phenol-aldehyde resin, such as phenol-formaldehyde, and cured to an infusible state. Such materials are well known and are described in U.S. Patent No. 2,810,775.

Figure 1:
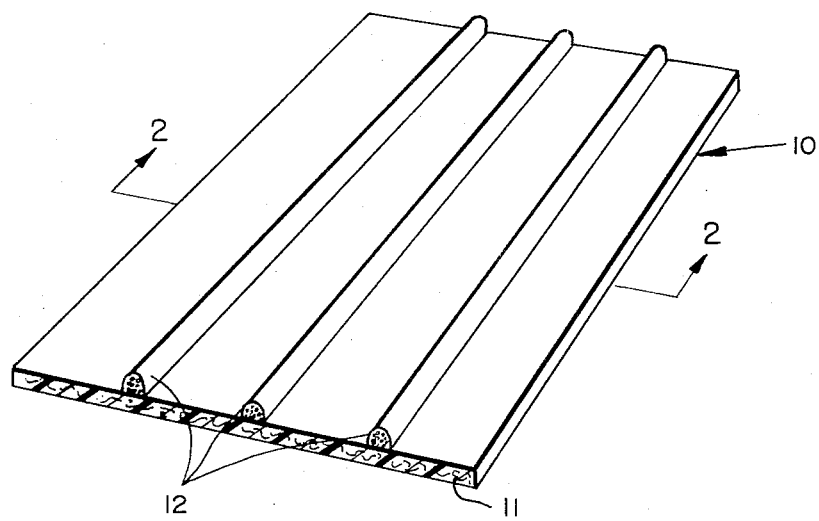
FIGURE 1 is a perspective view of the ribbed separator of this invention.
Figure 2:
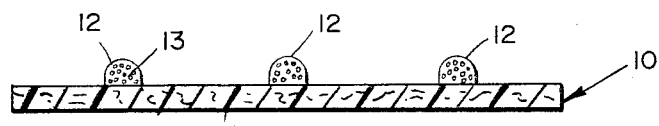
FIGURE 2 is a cross-section of the separator taken on line 2—2 of FIGURE 1 and illustrates the cellular structure of the rib.

In the figures the numeral 10 indicates a panel made of any material which is used to prepare separators, such as an impregnated cellulosic web 11, and the numeral 12 represents the ribs comprised of a multiplicity of voids 13.

The cellular rib of the present invention is formed of a plasticized acid-resistant thermoplastic resin composition comprising a first resin and a second resin having a high plasticizer tolerance and having intimately dispersed therein a finely divided blowing agent. When fluxed, the composition produces a resilient rib which is comprised of a myriad of substantially uniform and predominantly closed noncommunicating cells. The uniformity of the cells and their noncommunicating relationship provide ribs which respond uniformly to vibratory pressures. Irregular and intercommunicating cells give weak ribs which are apt to collapse under service conditions. Rigid ribs, even though cellular, are not effective. Accordingly, the resin which is used to form the ribs must be one which, when fluxed, is characterized by resilient properties The cellular ribs of the present invention also possess a relatively high degree of heat stability.

Vinyl chloride resins are particularly useful as rib-forming materials for the present invention The resin which has a high plasticizer tolerance generally comprises about 2 to 15 percent by weight of the total polymer content of the rib composition. In a preferred embodiment the second resin is about 5 percent of the total polymer The first resin which comprises the major portion of the rib material is a high molecular weight polyvinyl chloride having a specific viscosity of not less than about 0.500. The second resin is a low molecular weight polyvinyl chloride having a specific viscosity of about 0.30 to about 0.40 and which has a Plasticizer Absorbance Index (PAI) of at least 6, i.e., a relatively high plasticizer tolerance. Specific viscosity is determined on 0.1 g. of polymer in 100 ml. of nitrobenzene with an Ostwald-Fenake Viscosity at 25° C. PAI is defined as the amount of plasticizer absorbed in grams per 100 grams of polymeric material.

The resin having a high plasticizer tolerance provides for greater stretch during the blowing which results in greater volume, thereby lowering the density of the rib.

As examples of other suitable acid-resistant thermoplastic resins having the above-described characteristics that may be suitable for use as the predominant resin in the present invention, mention may be made of polyvinyl acetate, polyvinyl butyrate, and copolymers of vinyl chloride, and vinyl acetate. Copolymers of vinyl chloride and vinyl acetate having a high plasticizer tolerance may be used as the second resin in the present invention.

The plasticizer employed may be any of the well-known nonvolatile plasticizers for vinyl resins which solvate the resin at elevated temperatures. These include such primary plasticizers as dioctyl phthalate, diisooctyl phthalate, dodecyl phthalate di(n-octyl-n-decyl) phthalate, acetyl tributyl citrate, dioctyl sebacate, dihexyl adipate, 2-ethylhexyl diphenyl phosphate, and tricresyl phosphate. Secondary plasticizers such as petroleum residue products commonly used as rubber softeners and plasticizers (Mobilsol L), may be used to supplement or replace a part of the primary plasticizer. The total amount of plasticizer used should be sufficient to provide the ribs with the desired degree of resiliency. Generally, the percentage of plasticizer may range between about 60 to 120 percent. The percentages are based on the weight of the total resin.

The blowing agents are employed in a finely divided state in the range of about 1 to 3 microns. They are so selected that their decomposition temperatures are slightly below the final fluxing temperature of the vinyl resin composition. A difference between maximum fluxing temperature and decomposition of the blowing agent of about 15° to 30° C. is satisfactory. By so choosing the blowing agent, it is possible to produce expansion when the resin composition is in a fairly tough gel state, i.e., when it is not so fluid that blowing will cause perforations in the surface of the mass nor so well gelled as to prevent proper expansion of gas. There are numerous blowing agents which are suitable for developing the proper cell structure in the ribs. Among those which can be used are azodicarbonamide, dinitrosopentamethylene tetramine, diazoaminobenzene, p,p′oxybis (benzene sulfonyl hydrazide), sodium carbonate, ammonium carbonate and ammonium bicarbonate. The nitrogen-evolving compounds are particularly suitable. The quantity of blowing agent may vary from between about ½ to 10 percent based on the total weight of the resin. Good cell formation is realized when 2 to 5 percent is used.

In addition to the resin, plasticizer, and blowing agent, various other additives may be included to modify the rib-forming compositions. These include fillers, such as anhydrous calcium sulfate, talc, wood flour, clay, diatomaceous earth and asbestos; stabilizers, such as sodium silicate sulfae, tetrasodium pyrophosphate, tribasic lead silicate sulfate, calcium stearate, organo-tin complexes, epoxy resins and epoxidized oils; pigments, such as carbon black, titanium dioxide and aluminum powder; and dispersing agents, such as zinc resinate, lecithin, glycol stearate, propylene glycol laurate and glycerol monooleate; and blowing agent catalysts, such as metal soaps such as lead stearate, zinc stearate, and zinc octonoate, and dibasic lead phosphate.

The method by which the rib-forming resin composition is formulated is not significant. Any method may be used so long as the components are thoroughly mixed. A satisfactory method for preparing a polymeric rib composition is to first premix the stabilizers and fillers and then add the blowing agent, resins, and plasticizer with thorough mixing at room temperature until a heavy paste having a Sever's Rheometer Value of 40 to 200 g./100 sec. is formed.

The complete separators may be made in a number of ways. In one method the composition, such as described in Example 1, may be extruded at low pressure and room temperature in a plurality of spaced strips onto a suitable panel. The material used as the panel is preferably composed of a cellulosic web or paper which has been impregnated with a phenol-formaldehyde resin and given a partial cure by passing over a heated drum. After the strips of polymer composiiton have been dispersed onto the panel, the so-assembled separator is passed into a circulating air jet oven with an air temperature sufficient to flux the polymeric rib composition and complete the cure of the phenol-formaldehyde resin. About 10 to 30 seconds is generally sufficient to effect complete fluxing and cure. The blowing agent is activated during the heating step whereby the cell structure of the ribs is formed.

In a preferred embodiment the curing temperature is around 370 to 400° F., more preferably 380° F., and the dwell time in the heated zone for the polymeric composition is about 15 to 20 seconds.

It is also within the scope of this invention to apply ribs to both sides of a panel by any method described.

The following nonlimiting examples illustrate the novel polymeric rib composition of the present invention.

*Example 1*

| | Parts by weight |
|---|---|
| Polyvinyl chloride resin (specific viscosity 0.500) | 95.0 |
| Polyvinyl chloride resin (specific viscosity 0.37, PAI 6–7) | 5.0 |
| Azodicarbonamide | 2.5 |
| Clay | 35.0 |
| Sodium silicate sulfate | 3.0 |
| Zinc octonoate | 1.5 |
| Dioctyl phthalate | 100.0 |

The clay, sodium silicate sulfate, and zinc octonoate were premixed at room temperature for one-half hour. The resins, dioctyl phthalate, and azodicarbonamide were then added and mixing was continued at room temperature until a heavy paste having a Sever's Rheometer Value of 50–60 g./100 sec. was obtained. The composition was then extruded at room temperature in a plurality of strips onto a suitable panel. The ribbed panel was then cured at a temperature of 380° F. for 17 seconds. The thus-formed ribs had a density of 30 lbs./ft.³ and a compressibility of 0.021 inch at a thickness prior to compression of 0.040 inch under 2.5 p.s.i. The ribs showed a high degree of heat resistance.

*Example 2*

Compressible foamed ribs were prepared according to the procedure of Example 1 with the exception that 98 parts of polyvinyl chloride having a specific viscosity of 0.500 and 2 parts of polyvinyl chloride having a specific viscosity of 0.37 and a PAI 6–7 were used. The finished ribs had a density of 36.7 lbs./ft.³ and a compressibility about 0.018 to 0.020 inch of a thickness prior to compression of 0.040 inch under 2.5 p.s.i. The ribs showed a high degree of heat resistance.

*Example 3*

Compressible foamed ribs were prepared according to the procedure of Example 1 with the exception that 90 parts of polyvinyl chloride having a specific viscosity of 0.500 and 10 parts of polyvinyl chloride having a specific viscosity of 0.37 and a PAI 6–7 were used. The finished ribs had a density of 24.8 lbs./ft.³ and a compressibility of 0.018 to 0.020 inch of a thickness prior to compression of a 0.040 inch under 2.5 p.s.i. The ribs showed a high degree of heat resistance.

In order to further illustrate the advantages of the novel composition of the present invention, two compositions which do not contain high plasticizer tolerance resin are presented.

*Example 4*

| | Parts by weight |
|---|---|
| Polyvinyl chloride resin (specific viscosity 0.36) | 100.0 |
| Azodicarbonamide | 8.0 |
| Clay | 35.0 |
| Sodium silicate sulfate | 3.0 |
| Zinc octonoate | 1.5 |
| Diocyl phthalate | 100.0 |

The composition was processed in the same manner as in Example 1 except that a curing temperature of 370° F. was used. The ribs had a density of 20 lbs./ft.³ and a compressibility of about 0.022 inch of a thickness prior to compression of 0.040 inch under 2.5 p.s.i. of 0.022 inch. The ribs showed poor heat resistance.

*Example 5*

| | Parts by weight |
|---|---|
| Polyvinyl chloride resin (specific viscosity 0.500) | 100.0 |
| Azodicarbonamide | 5.0 |
| Clay | 35.0 |
| Sodium silicate sulfate | 3.0 |
| Zinc octonoate | 1.5 |
| Dioctyl phthalate | 100.0 |

The composition was processed in the same manner as Example 1 except that a curing temperature of 395° F. was used. The ribs had a specific gravity of 45 lbs./ft.³ and a compressibility of 0.014 inch of a thickness prior to compression of 0.040 inch under 2.5 p.s.i. The ribs had a high degree of heat resistance.

An examination of the results of Example 4 show that by using a relatively large amount of blowing agent (almost three times that of Example 1) a low molecular weight resin can be utilized to provide a rib having good density and compression values. However, ribs prepared from low molecular weight resins have low heat distortion temperatures, i.e., poor heat resistance, which makes such ribs less suitable in separator applications. As a result of the heat distortion of the polymeric ribs, the battery plates will be held less tightly and the life of the battery will be adversely affected.

Example 5 shows that use of a high molecular weight resin with even twice the blowing agent of Example 1 provides a product which has a high heat distortion temperature but which is too dense and which has too low a compressibility to provide a satisfactory resilient rib.

By comparing the results of Examples 4 and 5 with Examples 1, 2, and 3, it can be readily seen that by including a high plasticizer tolerance resin in the composition, a product is produced which has the desired density and compressibility and which also possess the heat stability of the high molecular weight resin.

As was stated above, the low molecular resin must be one which has a high tolerance for plasticizer. This can be illustrated by the following example.

*Example 6*

| | Parts by weight |
|---|---|
| Polyvinyl chloride resin (specific viscosity 0.50) | 50.0 |
| Polyvinyl chloride resin (specific viscosity 0.325, PAI 4 to 5) | 50.0 |
| Azodicarbonamide | 5.0 |

| | Parts by weight |
|---|---|
| Clay | 35.0 |
| Sodium silicate sulfate | 3.0 |
| Zinc octonoate | 1.5 |
| Dioctyl phthalate | 100.0 |

The composition was processed according to the procedure of Example 1 except that a curing temperature of 395° F. was used. The ribs had a density of 45 lbs./ft.³ and a compression of 0.009 inch of a thickness prior to compression of 0.040 inch under 2.5 p.s.i. The ribs had a moderate degree of heat resistance.

It can readily be seen that even a relatively large amount of low molecular weight resin which does not have the necessary PAI value fails to provide ribs having the desired density and compressibility. The product of Example 6 is too dense and the compression is tooo low, thereby providing ribs of low resiliency.

The novel resilient ribs of the present invention are characterized by having a maximum density of about 40 lbs./ft.³, preferably about 35 lbs./ft.³, a minimum compressibility of an 0.040-inch thick sample under a 2.5 p.s.i. of 35 to 40 percent and a recovery of substantially 100 percent. The density is preferably as low as possible in order to minimize the quantity of polymer necessary to form the ribs. The density of the ribs of the present invention generally ranges from 20 to 35 lbs./ft.³.

Although in the above-recorded tests the thickness of the ribs was 0.040 inch, it should be understood that various thicknesses may be used as desired. Ribs ranging from 0.020 to 0.175 inch may be prepared. The panels generally range between 0.025 and 0.075 inch.

What is claimed is:

1. An acid-resistant plate separator for storage batteries comprising a panel and a plurality of spaced, resilient, cellular ribs affixed to at least one side of said panel, said ribs being formed of a mixture of a first and second vinyl resin, said first resin having specific viscosity of at least 0.50, said second resin having a specific viscosity of 0.30 to 0.40 and a Plasticizer Absorbance Index of at least 6, said second resin being present at a level of about 5 to 15 percent by weight of the total of said first and second resins.

2. The product as defined in claim 1 wherein the panel is composed of a cellulosic material impregnated with a thermoset polymer and the ribs comprise a blown and fluxed mixture of polyvinyl chloride resins.

3. The product as defined in claim 1 wherein said ribs are formed from a polymeric composition containing from ½ to 10 percent of a blowing agent based on the total resins.

4. The product as defined in claim 1 wherein said ribs have a maximum density of 35 lbs./cu. ft. and a compressibility of at least about 35 to 40 percent of a thickness prior to compression of 0.040 inch under a 2.5 p.s.i. load.

5. An acid-resistant plate separator for storage batteries comprising a panel and a plurality of spaced, resilient ribs affixed to at least one side of said panel, said ribs comprising 95 weight percent of a vinyl chloride resin having a specific viscosity of not less than about 0.500 and 5 weight percent of a vinyl chloride resin having a Plasticizer Absorbance Index of about 6 to 7, said percentages being based on the total polymer weight.

References Cited

UNITED STATES PATENTS

| 2,681,377 | 6/1954 | Smithers | 136—145 X |
| 2,707,201 | 4/1955 | Fernald et al. | 136—146 |
| 2,936,328 | 5/1960 | Sillcox et al. | 136—145 |
| 3,036,143 | 5/1962 | Fisher et al. | 136—146 X |
| 3,205,098 | 9/1965 | Hall et al. | 136—145 |

OTHER REFERENCES

The Condensed Chemical Dictionary, 6th ed., pub. by Reinhold Pub. Corp., 1961, pp. 832, 902 and 903.

WINSTON A. DOUGLAS, *Primary Examiner.*

D. L. WALTON, *Assistant Examiner.*